US009261887B2

(12) United States Patent
Kuo et al.

(10) Patent No.: US 9,261,887 B2
(45) Date of Patent: Feb. 16, 2016

(54) PRESSURE BALANCE VALVE

(71) Applicant: Globe Union Industrial Corp., Taichung (TW)

(72) Inventors: Chungyu Kuo, Taichung (TW); Chunghsiang Chang, Taichung (TW); Yuanhao Chang, Taichung (TW); Chuwan Hong, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 149 days.

(21) Appl. No.: 14/140,487

(22) Filed: Dec. 25, 2013

(65) Prior Publication Data

US 2015/0177747 A1 Jun. 25, 2015

(51) Int. Cl.
*G05D 11/00* (2006.01)
*G05D 23/13* (2006.01)

(52) U.S. Cl.
CPC ....... *G05D 23/1313* (2013.01); *Y10T 137/2521* (2015.04)

(58) Field of Classification Search
CPC .................. Y10T 137/2514; Y10T 137/2521; G05D 23/1313
USPC .................................. 137/100, 625.4, 625.41
See application file for complete search history.

(56) References Cited

U.S. PATENT DOCUMENTS 4,979,530 A * 12/1990 Breda .......................... 137/100
6,427,713 B1 * 8/2002 Dempsey et al. ............... 137/98
8,267,111 B2 9/2012 Yang
2005/0224115 A1 * 10/2005 Lun-Jung ...................... 137/100
2006/0016487 A1 * 1/2006 Lin ............................... 137/597
2007/0069483 A1 * 3/2007 Bordeianu et al. .............. 279/62
2012/0138177 A1 6/2012 Wang
2012/0145936 A1 * 6/2012 Chang ................ F16K 11/0787 251/281
2013/0042923 A1 * 2/2013 Yan .......................... F15D 1/04 137/100
2013/0087232 A1 * 4/2013 Tung ...................... G05D 11/03 137/625.17
2013/0098474 A1 * 4/2013 Tung ................. G05D 23/1313 137/98

OTHER PUBLICATIONS

Loop. Macmillan Dictionary. Jun. 2015.*

* cited by examiner

*Primary Examiner* — R. K. Arundale

(74) *Attorney, Agent, or Firm* — Alan D. Kamrath; Kamrath IP Lawfirm, P.A.

(57) ABSTRACT

A pressure balance valve contains: a receiving chamber including an external cold-water inlet, an external hot-water inlet, an external cold-water outlet, and an external hot-water outlet; a valve core including a pressure sensing fence, a first ring portion and a second ring portion. Between the first ring portion and the pressure sensing fence is defined a cold-water pressure cavity, and between the second ring portion and the pressure sensing fence is defined a hot-water pressure cavity. The first ring portion has an internal cold-water inlet and an internal cold-water outlet, the second ring portion has an internal hot-water inlet and an internal hot-water outlet. The first ring portion also has at least one first fixing slot for fitting with at least one first resilient loop, and the second ring portion also has at least one second fixing slot for fitting with at least second resilient loop.

14 Claims, 19 Drawing Sheets

PRESSURE BALANCE VALVE

FIELD OF THE INVENTION

The present invention relates to a pressure balance valve.

BACKGROUND OF THE INVENTION

A conventional pressure valve is applied in various water supply devices, such as conventional or digital showering systems, as disclosed in U.S. Pat. No. 8,267,111 B2, US Publication Nos. US 2013/0042923 A1 and US 2012/0138177.

The water supply device is normally a temperature control faucet and includes a thermostatic valve and a temperature sensing element for matching with the thermostatic valve; the thermostatic valve can adjust desired mixing ratio of cold water and hot water based on a preset showing temperature.

The thermostatic valve can adjust the desired mixing ratio of the cold water and the hot water by adjusting a size of each of a cold-water orifice and a hot-water orifice. However, when the cold-water pressure of the cold-water orifice and the hot-water pressure of the hot-water orifice are not equal, the desired mixing ratio of the cold water and the hot water cannot be adjusted precisely. To overcome such a problem, a pressure balance valve is fixed on an inlet end of the water supply device so as to automatically adjust water pressures of the cold water and the hot water, thus balancing the cold-water pressure of the cold-water orifice and the hot-water pressure of the hot-water orifice.

Conventional pressure balance contains a housing, a fitting sleeve disposed in the housing, and a valve core, wherein between the housing and the fitting sleeve is defined a receiving chamber so that the valve core axially slides in the receiving chamber. The valve core includes a cold-water pressure room and a hot-water pressure room which are spaced from each other by a pressure sensing fence, and the pressure sensing fence has a cold-water detection face and a hot-water detection face so that the cold-water pressure in the cold-water pressure room and the hot-water pressure in the hot-water pressure room act on the cold-water detection face and the hot-water detection face, when a pressure difference between the cold-water pressure and the hot-water pressure is sensed, the valve core acts on the pressure sensing fence and automatically slides so as to balance the cold-water pressure and the hot-water pressure.

A receiving chamber of a pressure balance valve of another temperature control faucet is defined by a part of components of a thermostatic valve, such as, a thermostatic valve core in a cylinder shape, an end plug mounted on one first end of the thermostatic valve core, and a central shaft fixed on a second end of the thermostatic valve core. The central shaft drives the thermostatic valve core rotates in a valve seat of the thermostatic valve so as to adjust a mixing ratio of cold water and hot water, such that a peripheral fence of the receiving chamber can be rotated as well during mixing the cold water and the hot water together.

Accordingly, the valve core of the pressure balance valve has to axially slide quickly and accurately according to the pressure difference of the cold-water pressure and the hot-water pressure, hence a high stability and precision of the pressure balance valve is required.

Likewise, in some conditions, the valve core has to stop the cold water flowing into the cold-water pressure room or to stop the hot water flowing into the hot-water pressure room, a high tightness between the valve core and the housing is therefore required as well. To comply with above-mentioned requirements, a gap between an outer surface of the valve core and an inner surface of the housing has to be less than 0.03 mm, and the outer surface of the valve core and the inner surface of the housing have to be machined smoothly, thus causing high machining cost.

The present invention has arisen to mitigate and/or obviate the afore-described disadvantages.

SUMMARY OF THE INVENTION

The primary object of the present invention is to provide a pressure balance valve which is capable of overcoming the shortcomings of the conventional pressure balance valve.

To obtain the above objective, a pressure balance valve is fixed on a water supply device.

The pressure balance valve contains:

a receiving chamber being cylindrical and including an external cold-water inlet and an external hot-water inlet which are axially defined along an inner wall of the receiving chamber so that cold water and hot water flow into the receiving chamber from the external cold-water inlet and the external hot-water inlet, the receiving chamber also including an external cold-water outlet and an external hot-water outlet which are axially formed on the peripheral wall thereof so that the cold water and the hot water flow out of the external cold-water outlet and the external hot-water outlet from the receiving chamber;

a valve core including a pressure sensing fence radially extending thereon, a first ring portion and a second ring portion which axially extend along two sides thereof; between the first ring portion and the pressure sensing fence being defined a cold-water pressure cavity; between the second ring portion and the pressure sensing fence being defined a hot-water pressure cavity; the first ring portion having an internal cold-water inlet and an internal cold-water outlet which communicate with each other via the cold-water pressure cavity, wherein the internal cold-water inlet communicates with the external cold-water inlet, and the internal cold-water outlet communicates with the external cold-water outlet; the second ring portion having an internal hot-water inlet and an internal hot-water outlet which communicate with each other via the hot-water pressure cavity, wherein the internal hot-water inlet communicates with the external hot-water inlet, and the internal hot-water outlet communicates with the external hot-water outlet; the first ring portion also having at least one first fixing slot defined on an outer wall thereof; and the second ring portion also having at least one second fixing slot formed on an outer wall thereof;

at least one first resilient loop fitted in the at least one first fixing slot;

at least second resilient loop fitted in the at least one second fixing slot.

Thereby, a tolerance among the inner wall of the receiving chamber, the outer wall of the first ring portion, and the outer wall of the second ring portion can be increased, i.e., the tolerance of the present invention is increased to 0.2 mm, but a conventional tolerance is limited less than 0.03 mm, and $0.03\ mm < D\mathbf{2} - D\mathbf{1} < 0.2\ mm$ or $0.1\ mm < D\mathbf{2} - D\mathbf{1} < 0.2\ mm$ preferably. In other words, the tolerance of the present invention is increased, but the pressure balance valve still has excellent pressure balance. Accordingly, two size precisions of an outer diameter of an outer wall of the valve core and the inner diameter of the inner wall of the receiving chamber are greatly reduced, thus lowering manufacturing cost.

It is to be noted that a tolerance between the valve core and the receiving chamber can be increased, because the two first resilient loops and the two second resilient loops are used to fill a gap formed by the tolerance. In details, although the gap among the inner wall of the receiving chamber, the outer wall of the first ring portion, and the outer wall of the second ring portion can be increased, after the two first resilient loops and the two second resilient loops are mounted, they are pressed by water pressure to cause a deformation so as to fill the gap, such that the valve core is fitted with and slides along the receiving chamber smoothly so as to exactly and quickly react to a pressure difference between the cold water and the hot water, thereby obtaining stable and precise mixed temperature.

In addition, a surface roughness of the valve core is reduced greatly so as to eliminate surface grinding process, thus saving machining cost.

DETAILED DESCRIPTION OF THE PREFERRED EMBODIMENTS

Referring further to FIGS. 1-4, a pressure balance valve 1 according to a first embodiment of the present invention is fixed on a water supply device 2. The water supply device 2 is a temperature control faucet and includes a faucet body 3, a temperature controlling valve 4, and the pressure balance valve 1 adjacent to the temperature controlling valve 4. The faucet body 3 includes a mounting groove 3*a*, a cold-water inflow channel 3*b* communicating with the mounting groove 3*a*, a hot-water inflow channel 3*c*, and two mixing outflow channels 3*d*. The temperature controlling valve 4 is mounted in the mounting groove 3*a* and includes a valve seat 4*a*, a central shaft 4*b* secured on the valve seat 4*a*, a thermostatic valve core 4*c* connected with a bottom end of the central shaft 4*b* and formed in a cylinder shape, and an end plug 4*d* for closing a bottom end of the thermostatic valve core 4*c*; wherein the bottom end of the central shaft 4*b* engages with a top end of the thermostatic valve core 4*c*, and the central shaft 4*b* is connected with the thermostatic valve core 4*c* by ways of a bolt 4*e*.

Figure 5:
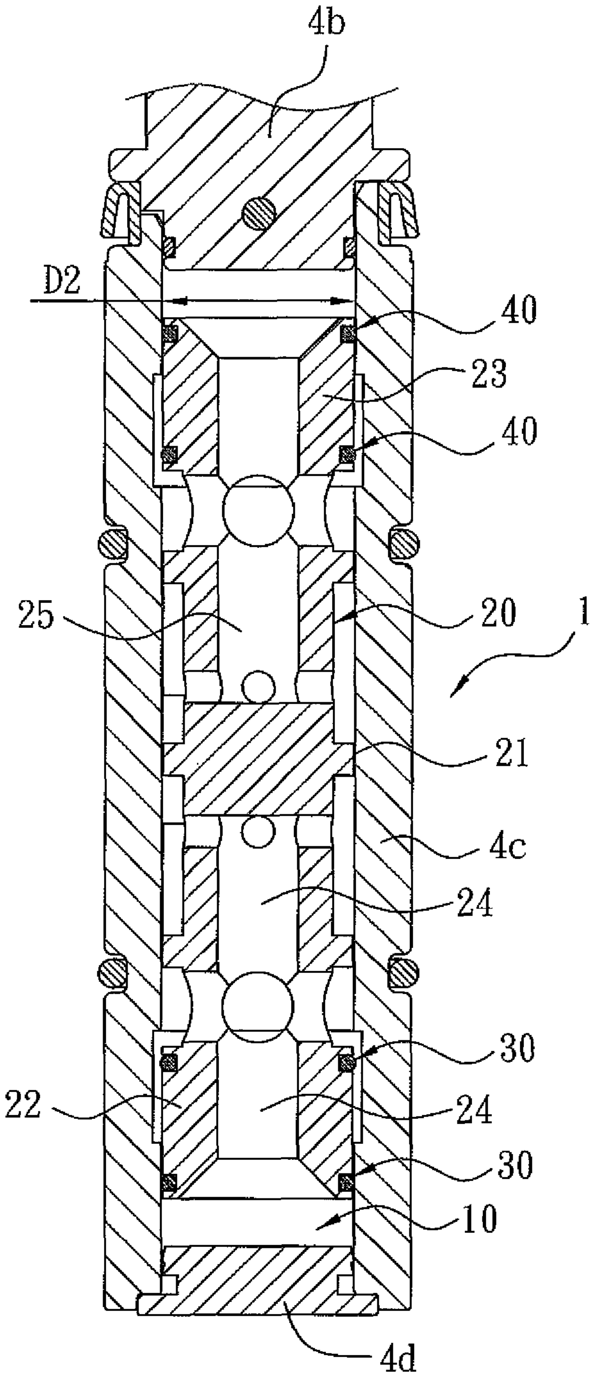
FIG. 5 is a cross sectional view showing the assembly of the pressure balance valve according to the first embodiment of the present invention.
Figure 6:
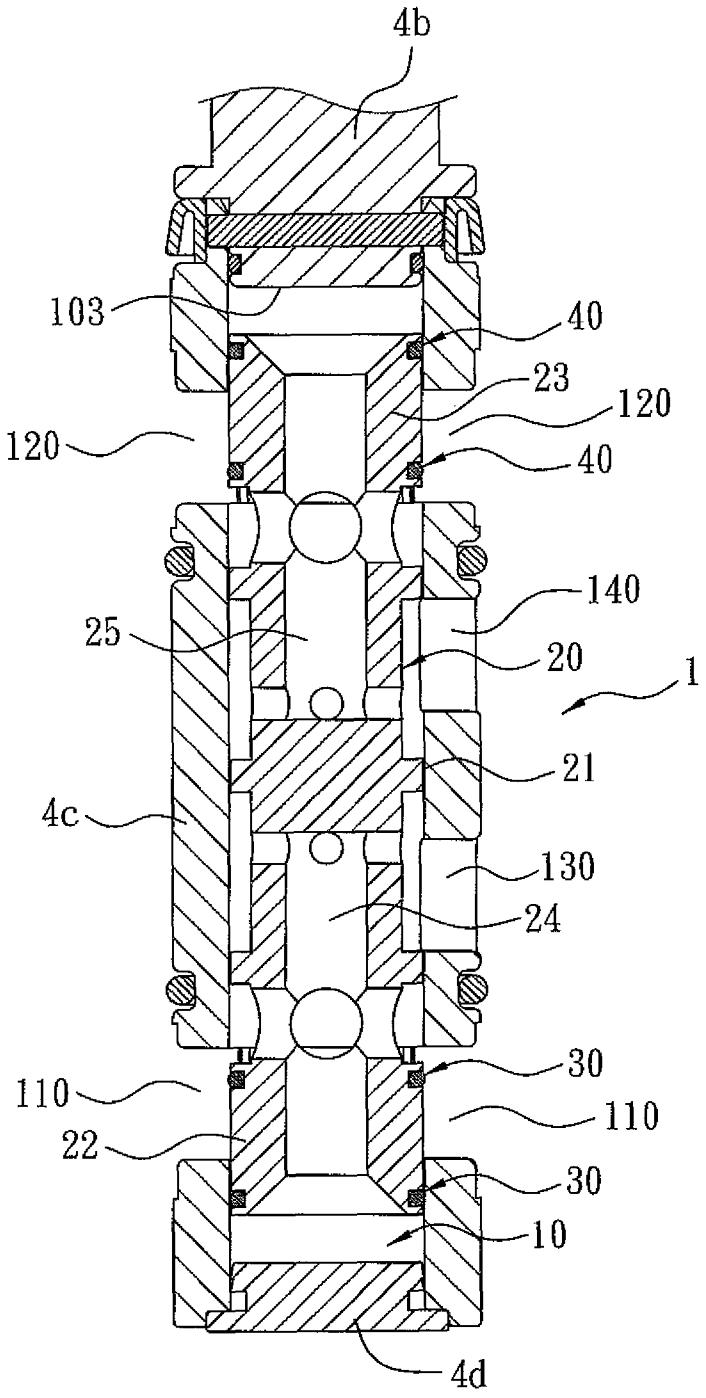
FIG. 6 is another cross sectional view showing the assembly of the pressure balance valve according to the first embodiment of the present invention.

Referring to FIGS. 5 and 6, the pressure balance valve 1 comprises a receiving chamber 10, a valve core 20, two first resilient loops 30, and two second resilient loops 40.

Figure 7:
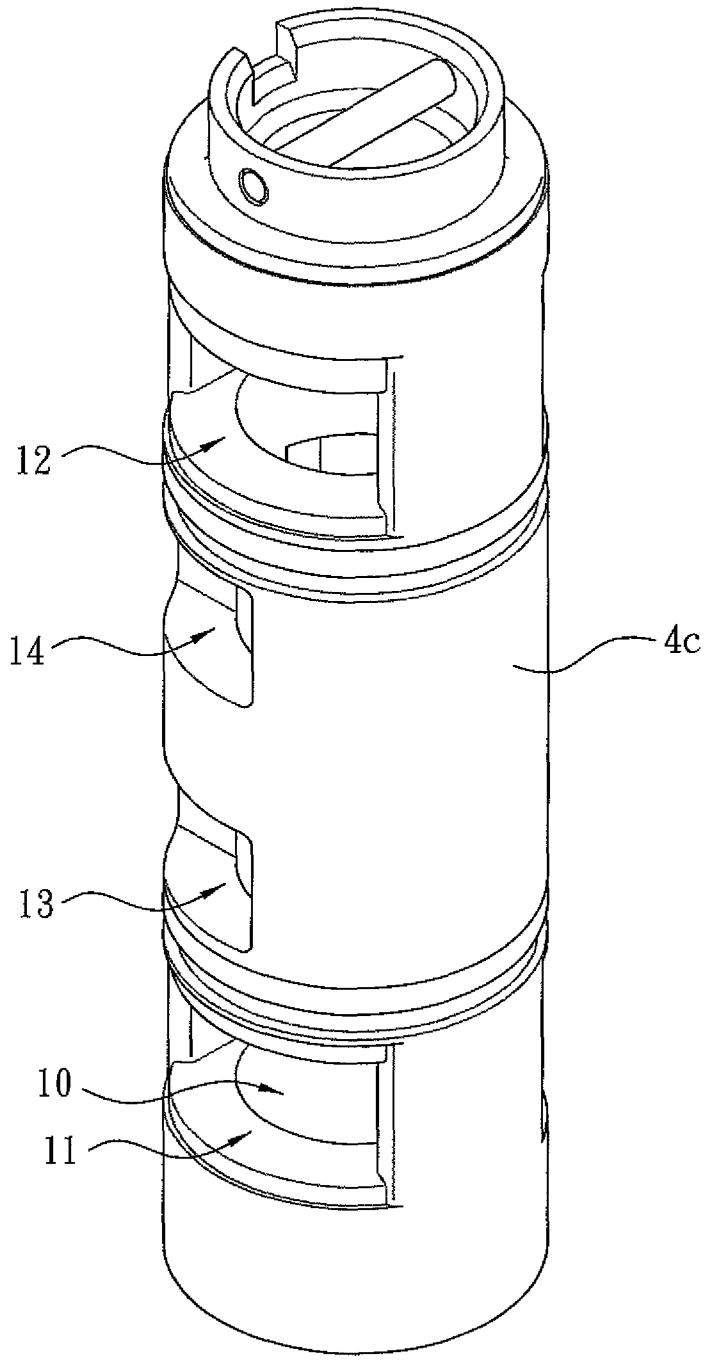
FIG. 7 is a perspective view showing a part of the assembly of the pressure balance valve according to the first embodiment of the present invention.

As shown in FIG. 7, the receiving chamber 10 is cylindrical and includes an external cold-water inlet 11 and an external hot-water inlet 12 which are axially defined along an inner wall of the receiving chamber 10 so that cold water and hot water flow into the receiving chamber 10 from the external cold-water inlet 11 and the external hot-water inlet 12. The receiving chamber 10 also includes an external cold-water outlet 13 and an external hot-water outlet 14 which are axially formed on the inner wall thereof so that the cold water and the hot water flow out of the external cold-water outlet 13 and the external hot-water outlet 14 from the receiving chamber 10.

Figure 8:
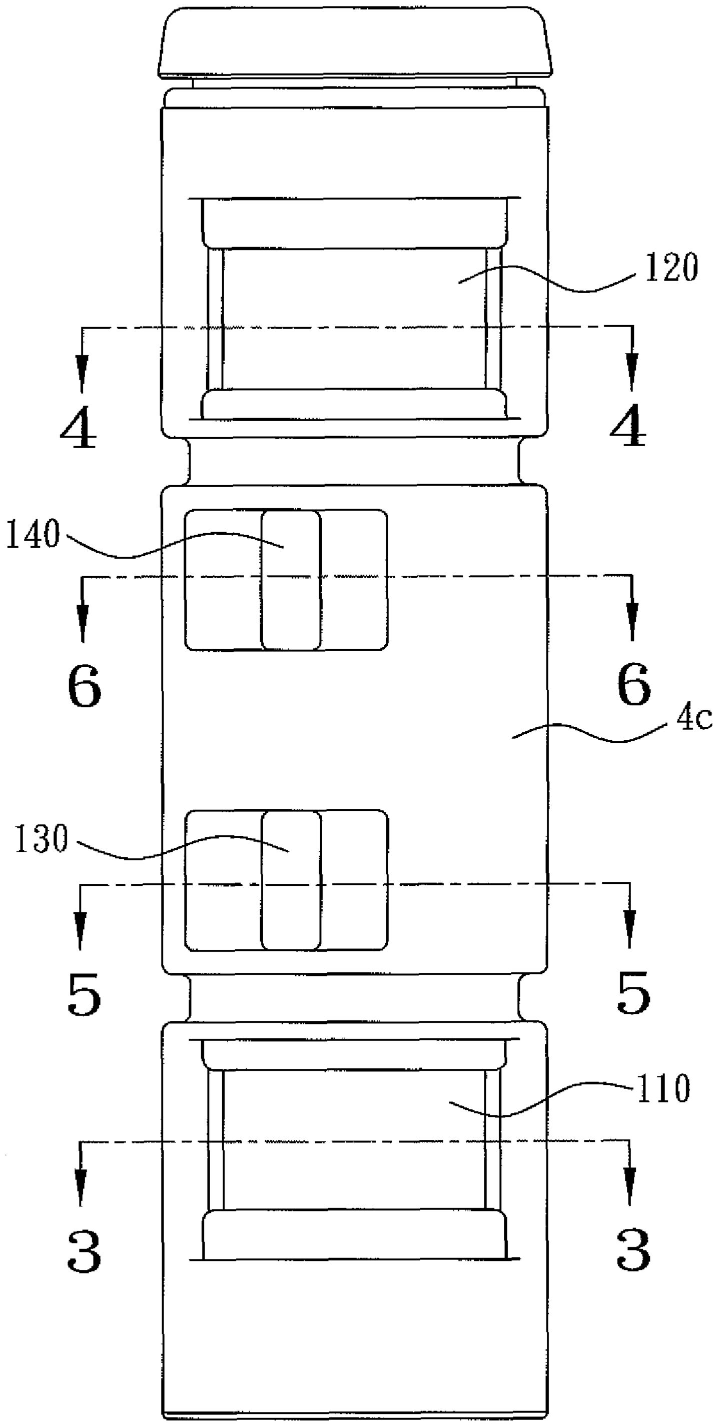
FIG. 8 is a plan view showing a part of the assembly of the pressure balance valve according to the first embodiment of the present invention.
Figure 9:
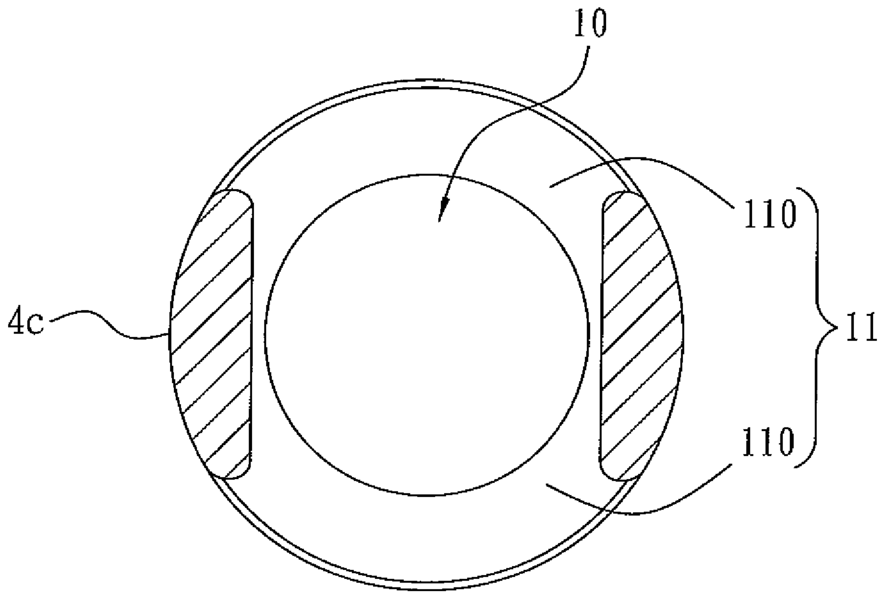
FIG. 9 is a cross sectional view taken along the line 3-3 of FIG. 8.
Figure 10:
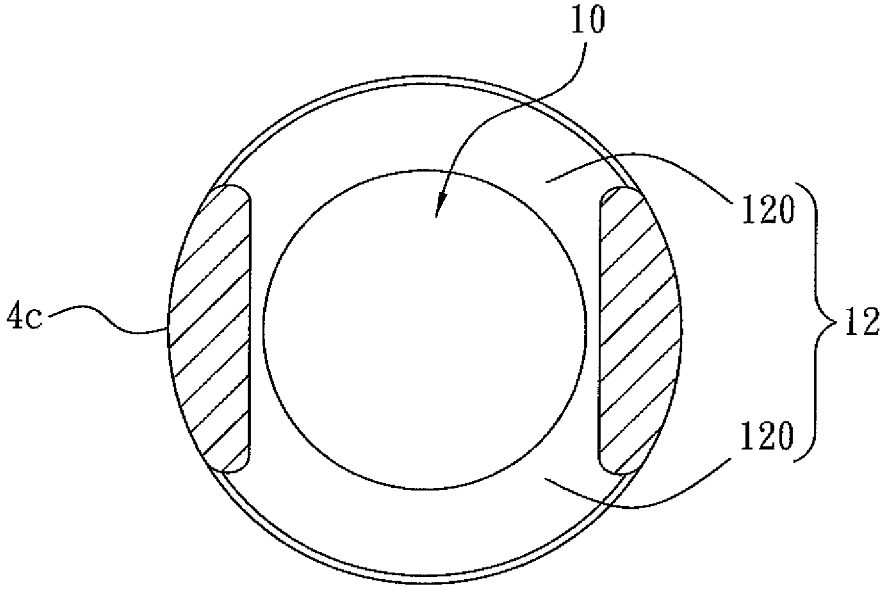
FIG. 10 is a cross sectional view taken along the line 4-4 of FIG. 8.

As illustrated in FIGS. 8-10, in this embodiment, the external cold-water inlet 11 includes two first openings 110 symmetrically defined along a peripheral wall thereof; and the external hot-water inlet 12 includes two second openings 120 symmetrically formed along a peripheral wall thereof.

Figure 1:
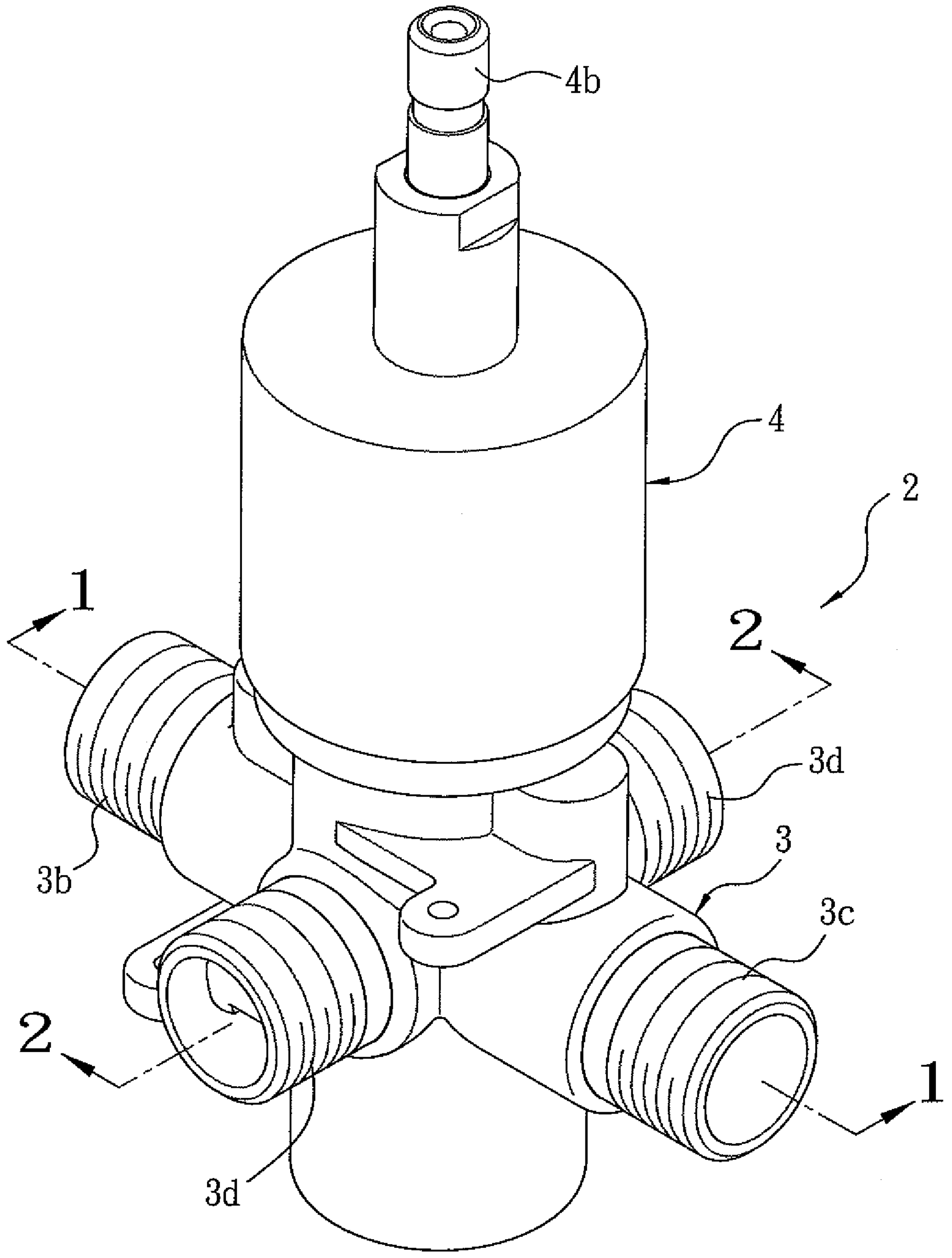
FIG. 1 is a perspective view showing a pressure balance valve being fixed on a water supply device according a first embodiment of the present invention.
Figure 2:
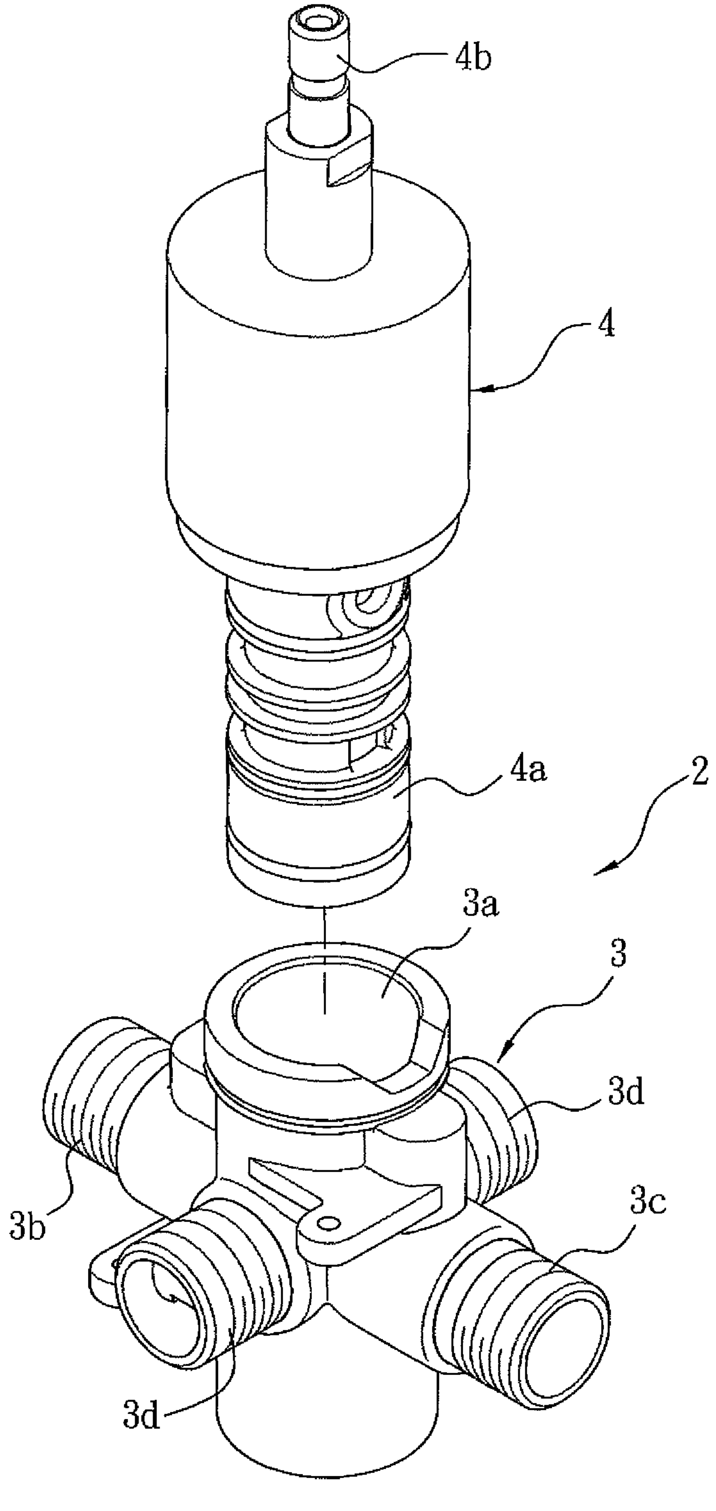
FIG. 2 is another perspective view showing the pressure balance valve being fixed on the water supply device according the first embodiment of the present invention.
Figure 11:
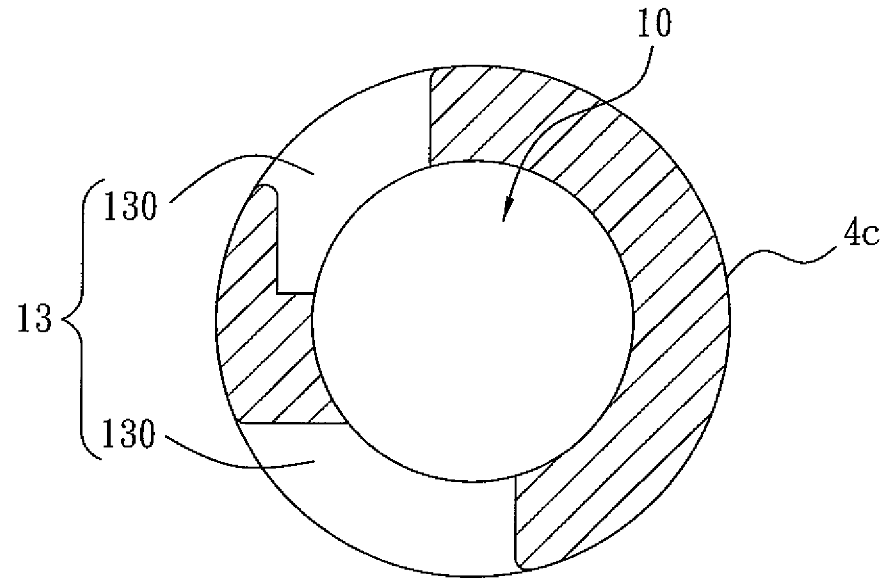
FIG. 11 is a cross sectional view taken along the line 5-5 of FIG. 8.
Figure 12:
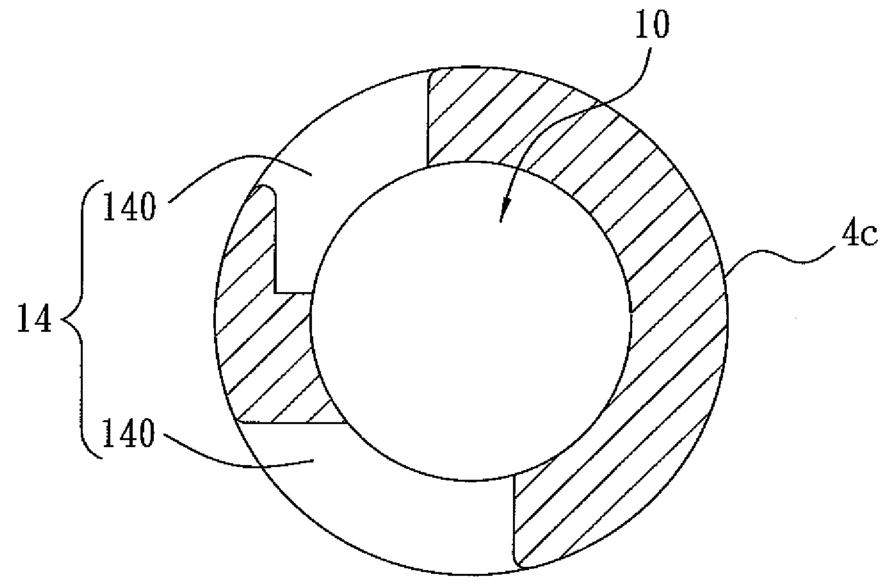
FIG. 12 is a cross sectional view taken along the line 6-6 of FIG. 8.

With reference to FIGS. 11 and 2, in this embodiment, the external cold-water outlet 13 includes two first orifices 130 unsymmetrically defined along a peripheral wall thereof; and the external hot-water outlet 14 includes two second orifices 140 unsymmetrically arranged along a peripheral wall thereof.

Referring to FIGS. 5 and 6, in this embodiment, the receiving chamber 10 is defined by the thermostatic valve core 4*c*, the central shaft 4*b* and the end plug 4*d*, and the peripheral wall of the thermostatic valve core 4*c* is defined by the thermostatic valve core 4*c*.

Figure 3:
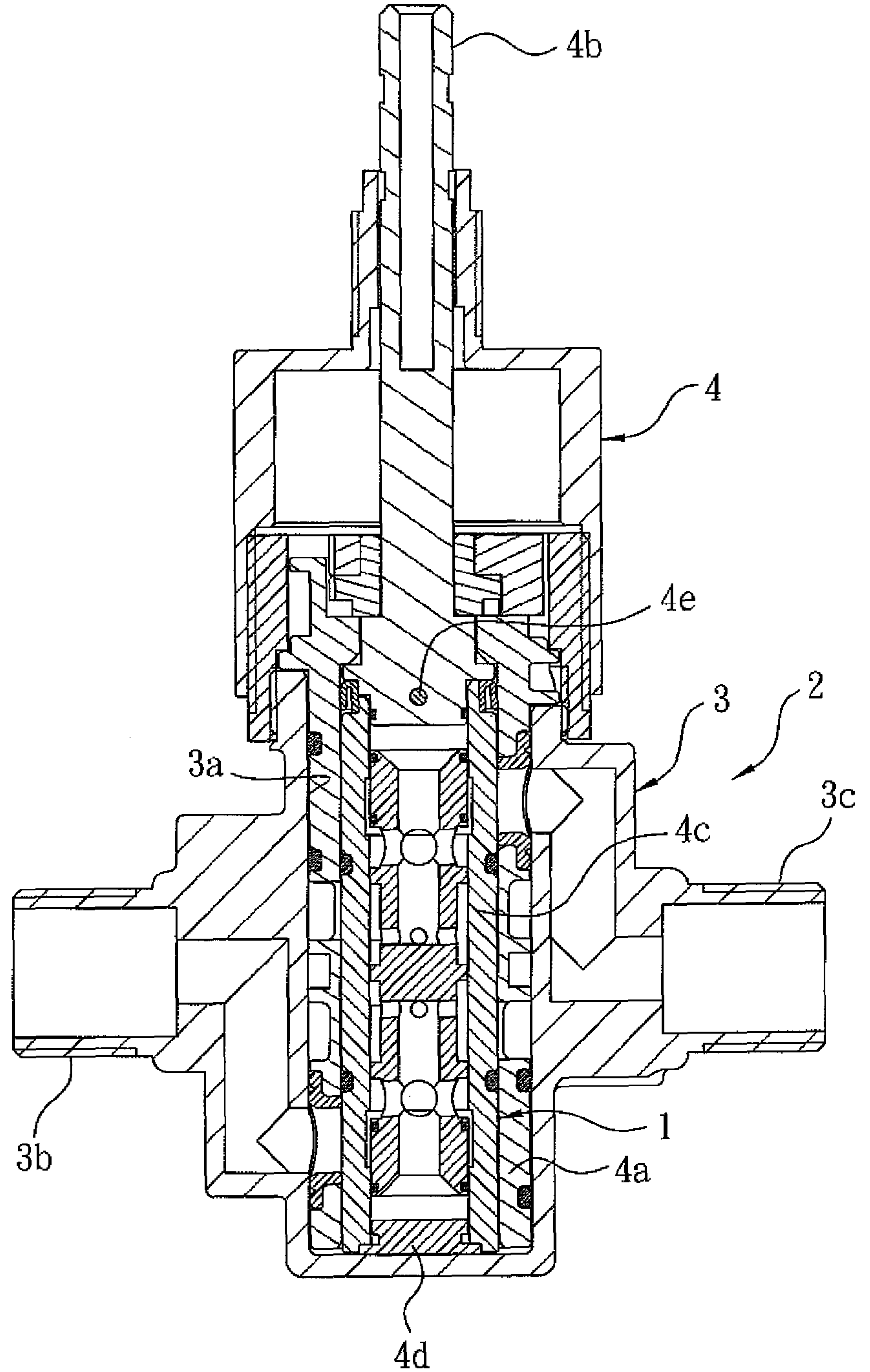
FIG. 3 is a cross sectional view taken along the line 1-1 of FIG. 1.
Figure 4:
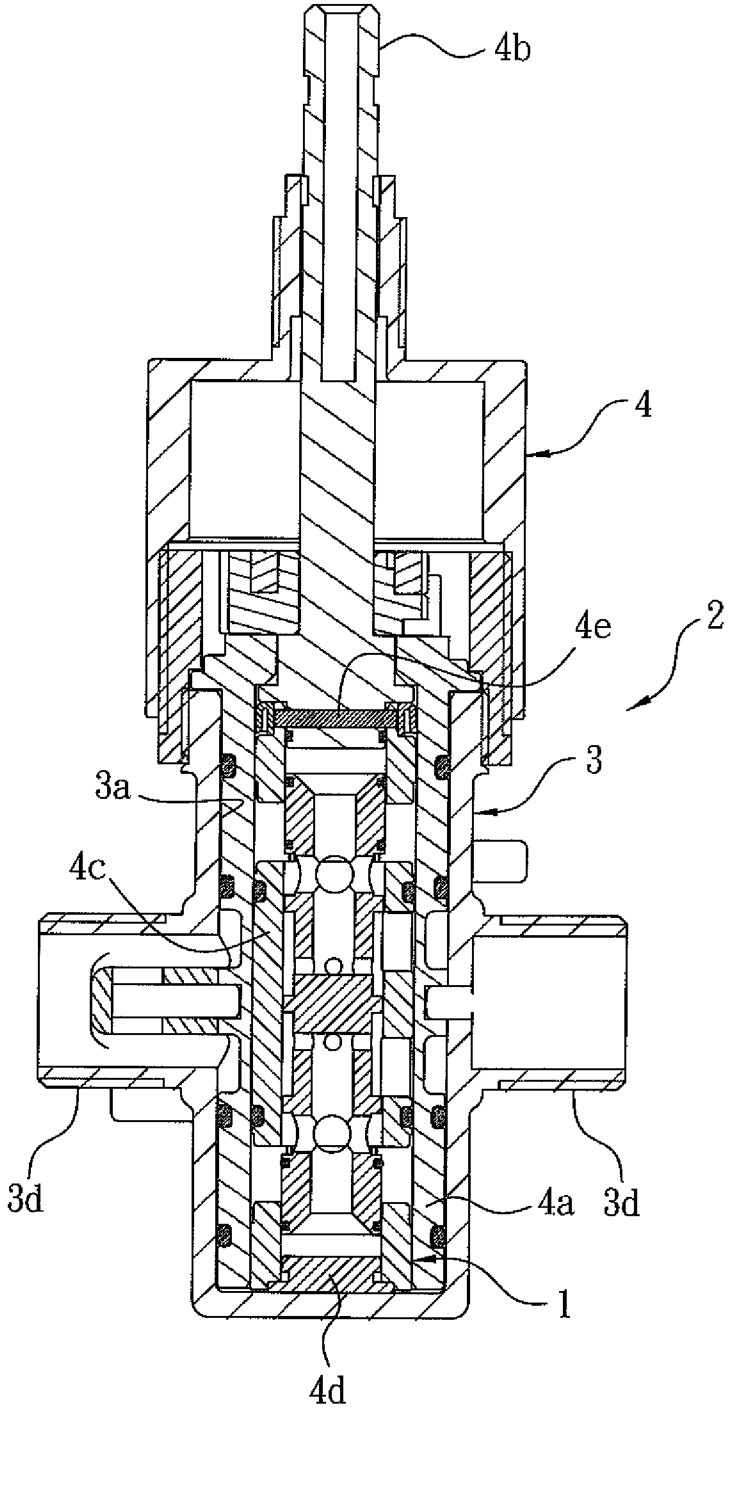
FIG. 4 is a cross sectional view taken along the line 2-2 of FIG. 1.

As shown in FIGS. 3 and 4, in this embodiment, the temperature controlling valve 4 is driven by the central shaft 4*b* to control a circumferential orientation angle of the thermostatic valve core 4*c* in the valve seat 4*a* and to adjust a mixed ratio of the cold water and the hot water which flow out of the pressure balance valve 1, thus adjusting a mixed temperature of the cold water and the hot water. However, the temperature controlling valve is a well-known art, so further remarks are omitted.

Figure 13:
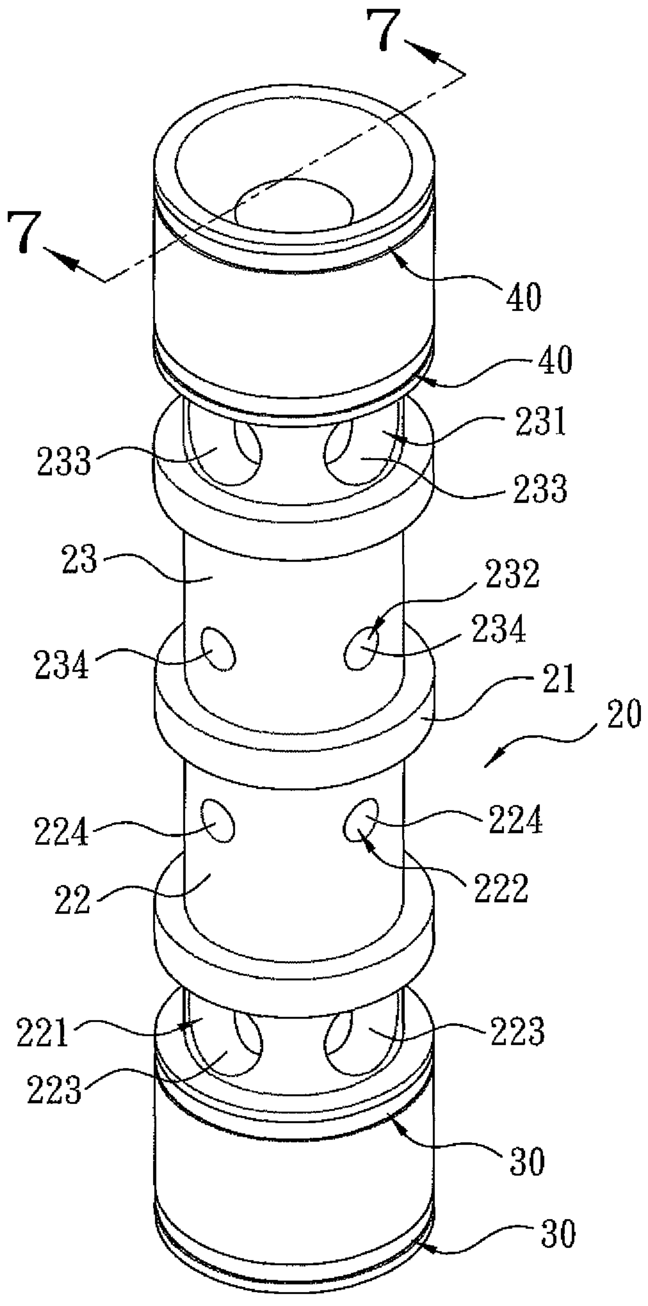
FIG. 13 is a perspective view showing the assembly of a valve core, two first resilient loops and two second resilient loops of the pressure balance valve according to the first embodiment of the present invention.
Figure 14:
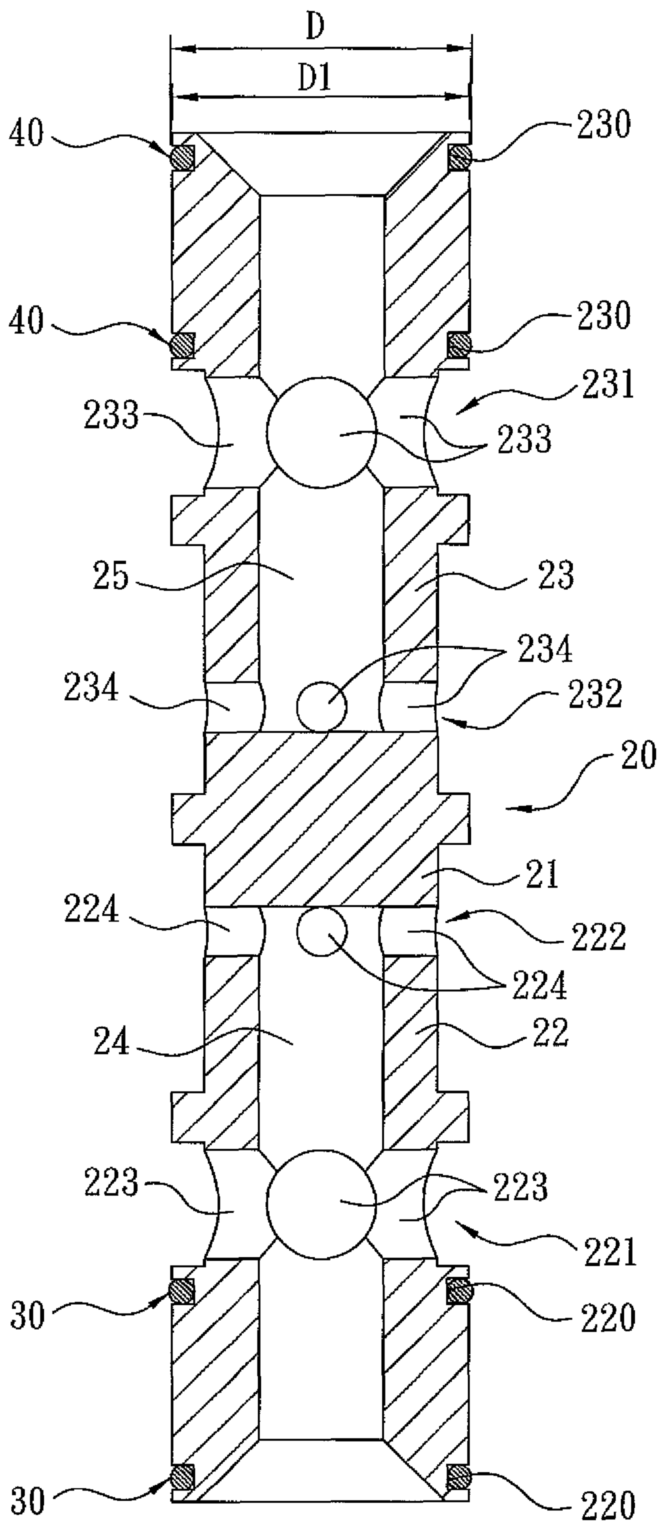
FIG. 14 is a cross sectional view taken along the line 7-7 of FIG. 13.

As illustrated in FIGS. 13 and 14, the valve core 20 includes a pressure sensing fence 21 radially extending thereon, a first ring portion 22 and a second ring portion 23 which axially extend along two sides thereof; between the first ring portion 22 and the pressure sensing fence 21 is defined a cold-water pressure cavity 24; between the second ring portion 23 and the pressure sensing fence 21 is defined a hot-water pressure cavity 25; the first ring portion 22 has an internal cold-water inlet 221 and an internal cold-water outlet 222 which communicate with each other via the cold-water pressure cavity 24, wherein the internal cold-water inlet 221 communicates with the external cold-water inlet 11, and the internal cold-water outlet 222 communicates with the external cold-water outlet 13; the second ring portion 23 has an internal hot-water inlet 231 and an internal hot-water outlet 232 which communicate with each other via the hot-water pressure cavity 25, wherein the internal hot-water inlet 231 communicates with the external hot-water inlet 12, and the internal hot-water outlet 232 communicates with the external hot-water outlet 14; the first ring portion 22 also has two first fixing slots 220 defined on an outer wall thereof; and the second ring portion 23 also has two second fixing slots 230 formed on an outer wall thereof.

The internal cold-water inlet 221 is comprised of four first holes 223 isometrically arranged around the first ring portion 22. The internal cold-water outlet 222 is comprised of four second holes 224 isometrically arranged around the first ring portion 22.

The internal hot-water inlet 231 is comprised of four first apertures 233 isometrically arranged around the second ring portion 23. The internal hot-water outlet 232 is comprised of four second apertures 234 isometrically arranged around the second ring portion 23.

Since the receiving chamber 10 of the pressure balance valve 1 is defined by the bottom end of the central shaft 4*b* of the temperature controlling valve 4, the thermostatic valve core 4*c* and the end plug 4*d*, when the central shaft 4*b* rotates, four positions of the external cold-water inlet 11, the external hot-water inlet 12, the external cold-water outlet 13 and the external hot-water outlet 14 on receiving chamber 10 change. In addition, the four second apertures 223, the four second apertures 224, the four first apertures 233 and the four second apertures 234 are isometrically arranged around the first ring portion 22 and the second ring portion 23 so that the cold water and the hot water flow into and flow out of the valve core 20 freely, thus avoiding influencing the pressure balance valve 1.

With reference to FIGS. 13 and 14, each first resilient loop 30 is fitted in each first fixing slot 220.

Each second resilient loop 40 is fitted in each second fixing slot 230.

When each first resilient loop 30 and each second resilient loop 40 are not fixed, their cross-sectional areas are circular. Furthermore, each first resilient loop 30 and each second resilient loop 40 are made of flexible material with high hardness and wearing resistance, such as rubber material. Preferably, the rubber material is any one of Acrylonitrile Butadiene rubber (NBR), Ethylene Propylene Diene Monome (EPDM), and polysiloxanes (i.e., silicone). It is preferable that a hardness (Shore hardness A) of the rubber material is within 60 to 90 degrees.

Referring to FIGS. 5 and 14, when the two first resilient loops 30 and the two second resilient loops 40 are fixed, an outer diameter of each of the two first resilient loops 30 and the two second resilient loops 40 is D; a diameter of the outer wall of each of the first ring portion 22 and the second ring portion 23 is D1; an inner diameter of the inner wall of the receiving chamber 10 is D2; wherein D1≤D≤D2, but preferably D1<D<D2.

Moreover, a tolerance among the inner wall of the receiving chamber 10, the outer wall of the first ring portion 22, and the outer wall of the second ring portion 23 can be increased, i.e., the tolerance of the present invention is increased to 0.2 mm, but a conventional tolerance is limited less than 0.03 mm, and 0.03 mm<D2−D1<0.2 mm or 0.1 mm<D2−D1<0.2 mm preferably. In other words, the tolerance of the present invention is increased, but the pressure balance valve 1 still has excellent pressure balance. Accordingly, two size precisions of an outer diameter of an outer wall of the valve core 20 and the inner diameter of the inner wall of the receiving chamber 10 are greatly reduced, thus lowering manufacturing cost.

It is to be noted that a tolerance between the valve core 20 and the receiving chamber 10 can be increased, because the two first resilient loops 30 and the two second resilient loops 40 are used to fill a gap formed by the tolerance. In details, although the gap among the inner wall of the receiving chamber 10, the outer wall of the first ring portion 22, and the outer wall of the second ring portion 23 can be increased, after the two first resilient loops 30 and the two second resilient loops 40 are mounted, they are pressed by water pressure to cause a deformation so as to fill the gap, such that the valve core 20 is fitted with and slides along the receiving chamber 10 smoothly so as to exactly and quickly react to a pressure difference between the cold water and the hot water, thereby obtaining stable and precise mixed temperature.

In addition, a surface roughness of the valve core 20 is reduced greatly so as to eliminate surface grinding process, thus saving machining cost.

Figure 15:
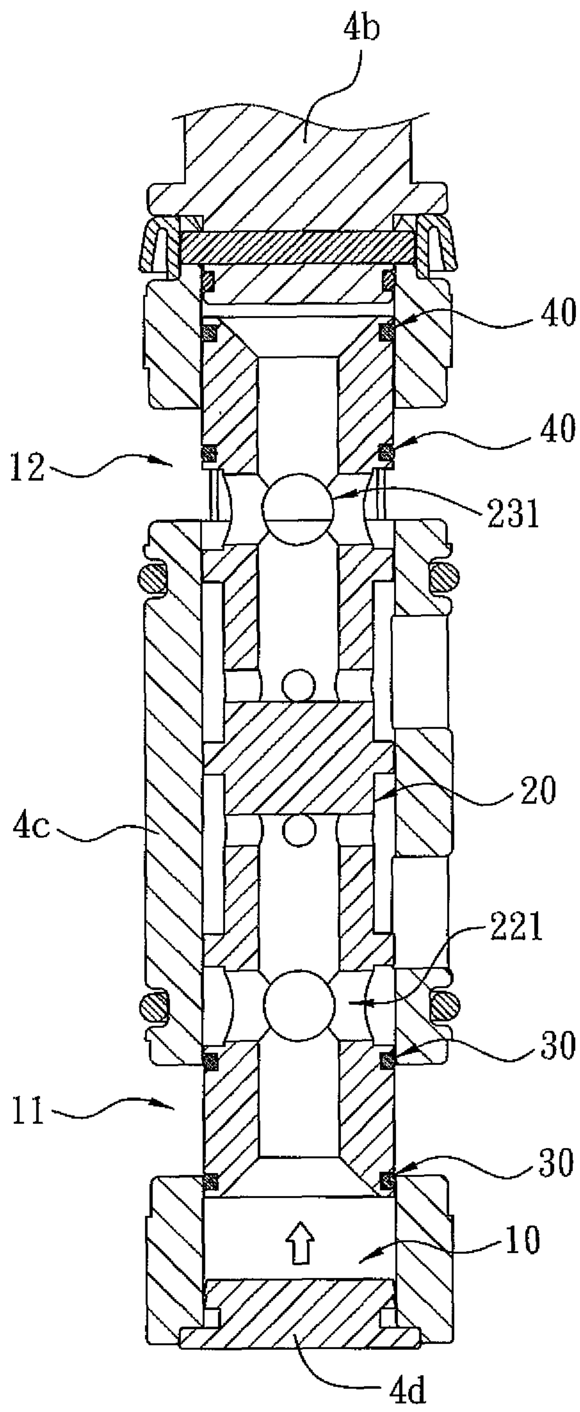
FIG. 15 is a cross sectional view showing the operation of the pressure balance valve according to the first embodiment of the present invention.
Figure 16:
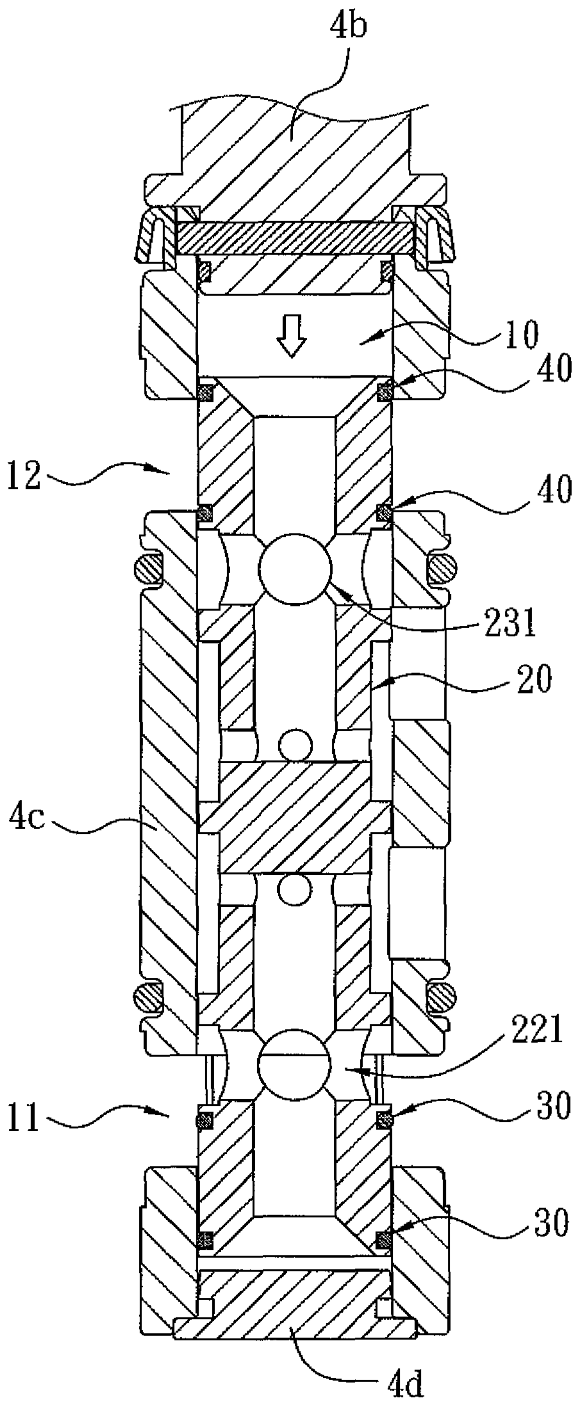
FIG. 16 is another cross sectional view showing the operation of the pressure balance valve according to the first embodiment of the present invention.

The two first resilient loops 30 and the two second resilient loops 40 are also provided to close the cold water and the hot water. For example, the valve core 20 is designed to move between a first dead point and a second dead point of the receiving chamber 10, as shown in FIG. 15, when the valve core 20 upwardly moves close to the first dead point, the two first resilient loops 30 are arranged to close the inner wall of the receiving chamber 10 where the external cold-water inlet 11 is defined so that the cold water which flows into the internal cold-water inlet 221 from the external cold-water inlet 11 is closed. Also, when the valve core 20 downwardly moves close to the second dead point, as shown in FIG. 16, the two second resilient loops 40 are arranged to close the inner wall of the receiving chamber 10 where the external hot-water inlet 12 is defined so that the hot water which flows into the internal hot-water inlet 231 from the external hot-water inlet 12 is closed.

The first ring portion 22 also has the two first fixing slots 220 defined on the outer wall thereof so as to fit with the two first resilient loops 30; and the second ring portion 23 also has the two second fixing slots 230 formed on the outer wall thereof so as to fit with the two second resilient loops 40. However, it is acceptable to provide one first fixing slot 220 for fitting with one first resilient loop 20 and to provide one second fixing slot 230 for fitting with one second resilient loop 40.

Figure 17:
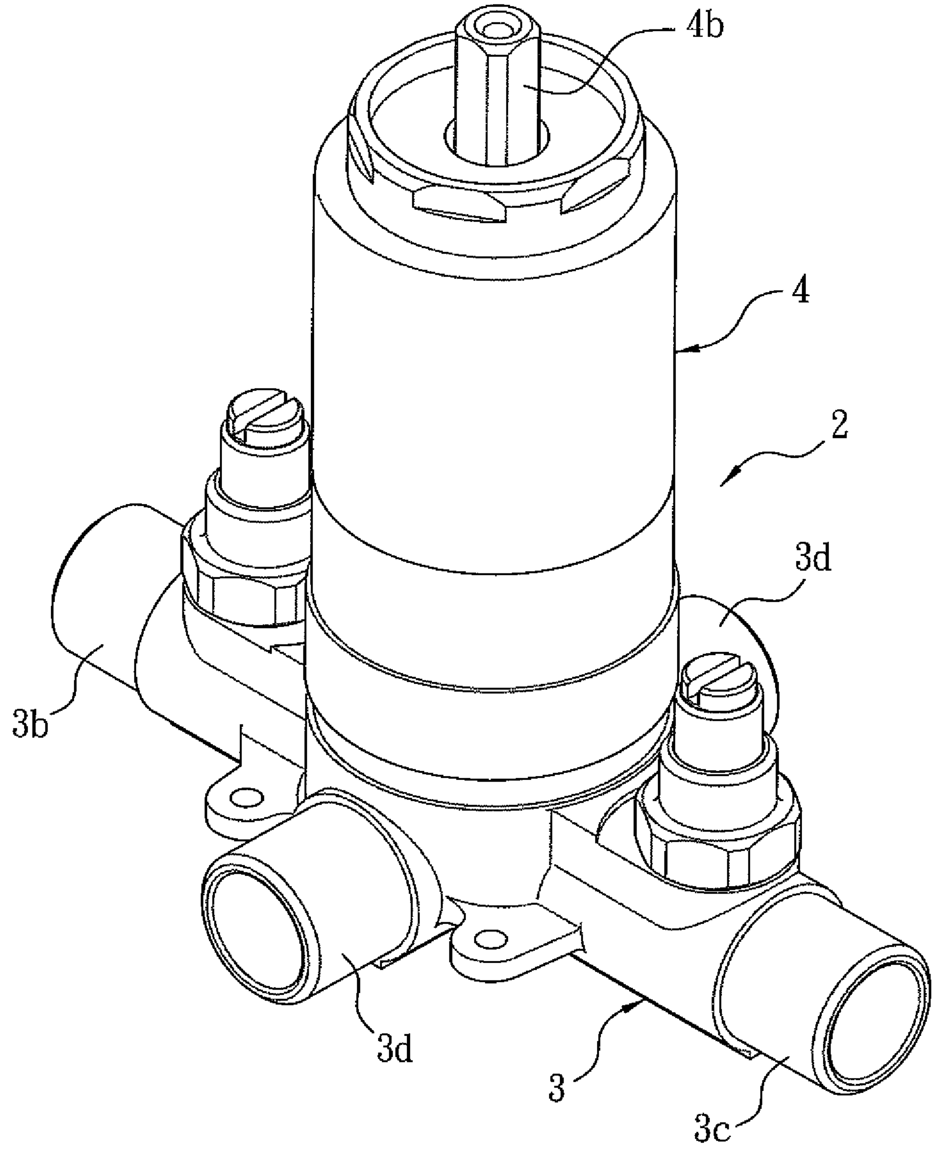
FIG. 17 is a perspective view showing a pressure balance valve being fixed on a water supply device according a second embodiment of the present invention.
Figure 18:
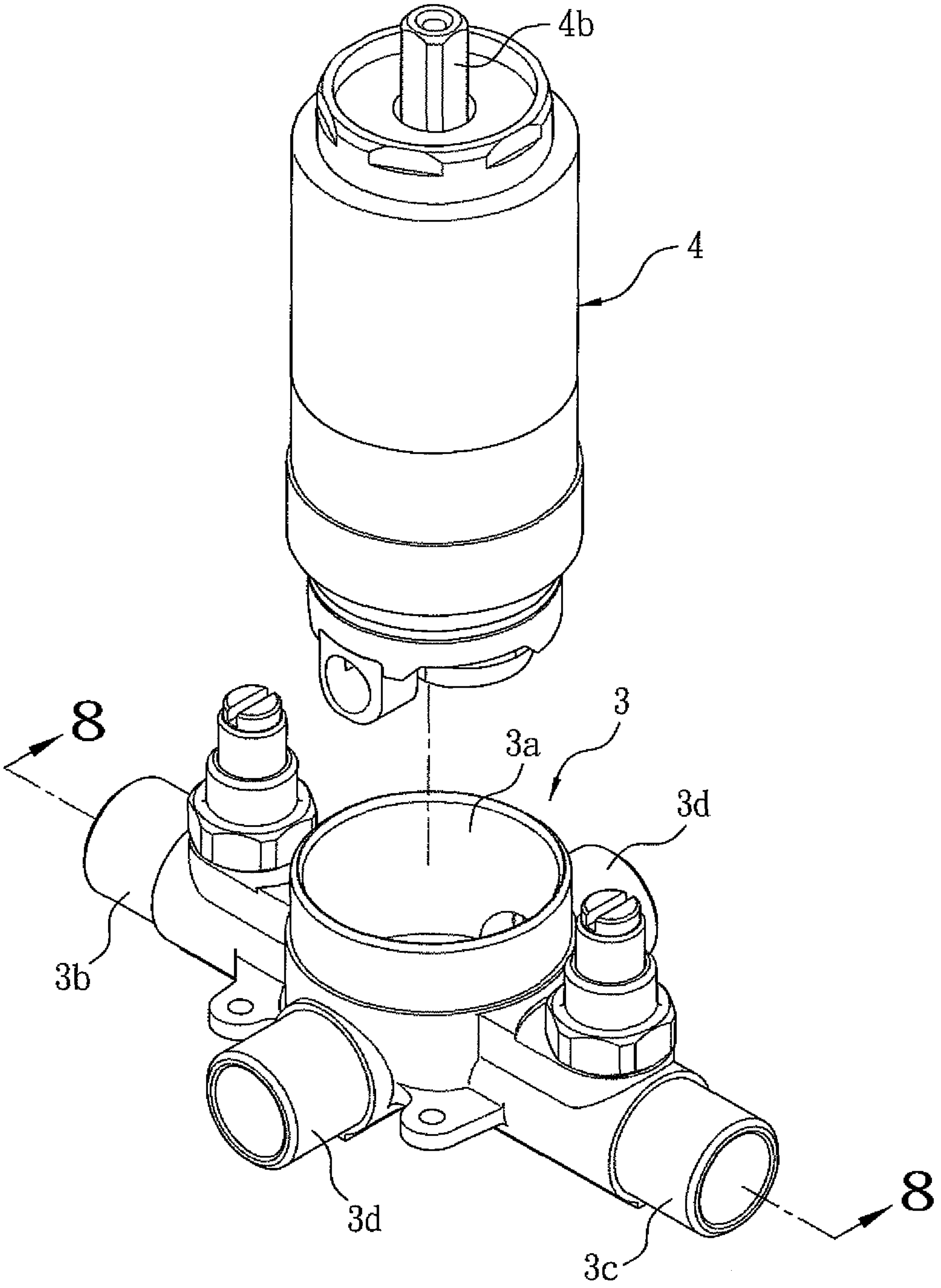
FIG. 18 is another perspective view showing the pressure balance valve being fixed on the water supply device according the second embodiment of the present invention.
Figure 19:
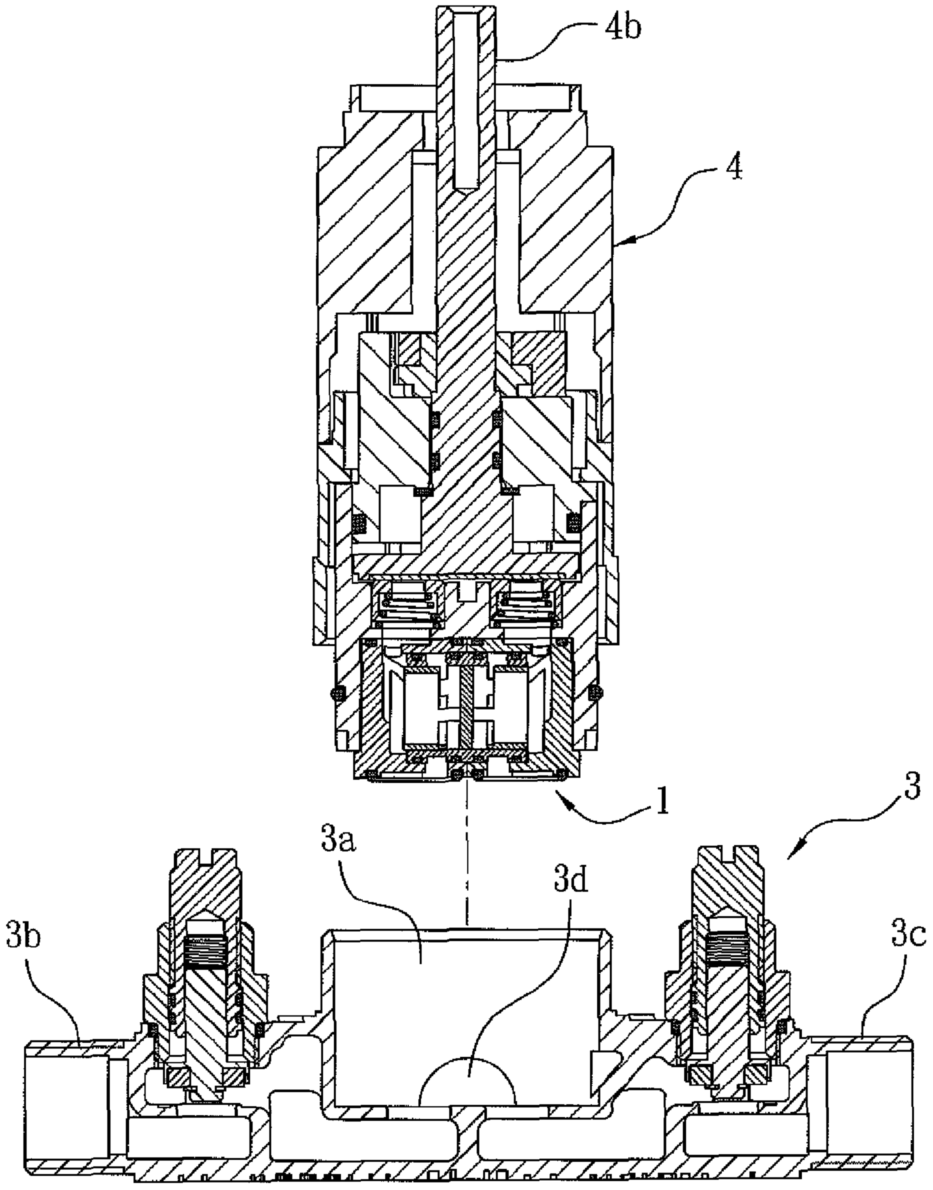
FIG. 19 is a cross sectional view taken along the line 8-8 of FIG. 18.

With reference to FIGS. 17-19, a difference of a pressure balance valve 1 of a second embodiment from that of the first embodiment comprises: the pressure balance valve 1 is fixed on a bottom end of a temperature controlling valve 4, such that after cold water flows upwardly to the pressure balance valve 1 from a cold-water inflow channel 3*b* of a faucet body 3, and hot water flows upwardly to the pressure balance valve 1 from a hot-water inflow channel 3*c* of the faucet body 3, a valve core 20 senses a pressure difference between the cold water and the hot water and automatically slides so as to balance pressure, and then the cold water and the hot water flow into the temperature controlling valve 4 to mix together, thereafter central shaft 4*b* adjusts a mixed ratio of the cold water and the hot water, and then a mixed water mixed by the cold water and the hot water downwardly flows back to two mixing outflow channels 3*d* of the faucet body 3, thus distributing the mixed water.

Figure 20:
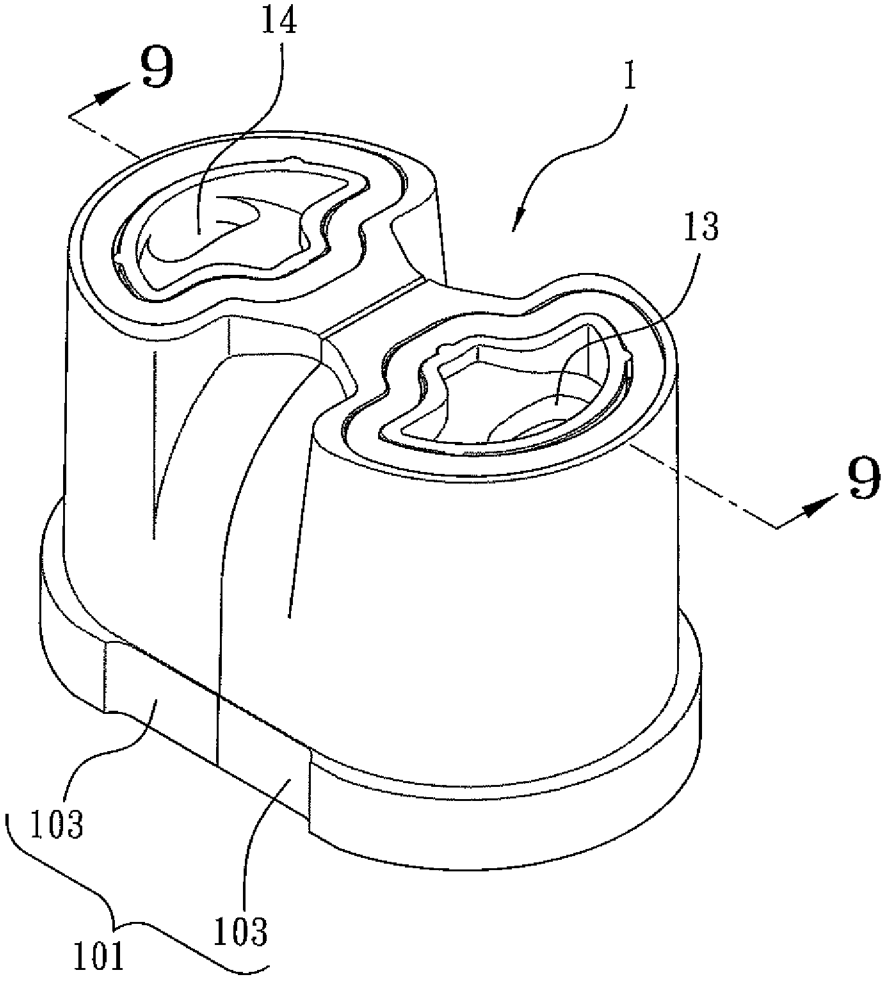
FIG. 20 is a cross sectional view showing the assembly of the pressure balance valve according to the second embodiment of the present invention.
Figure 21:
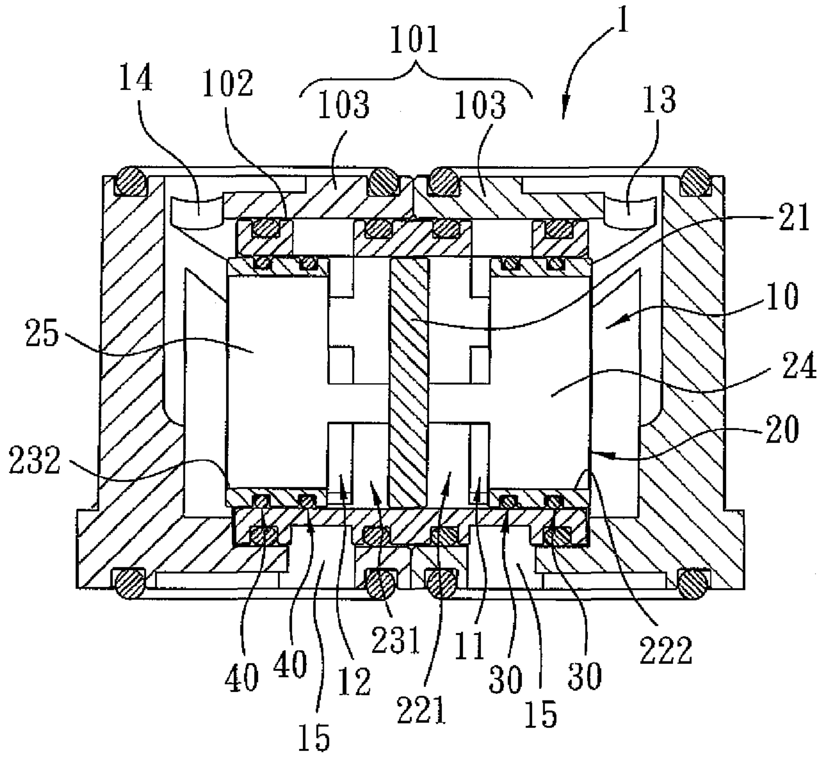
FIG. 21 is a cross sectional view taken along the line 9-9 of FIG. 20.
Figure 22:
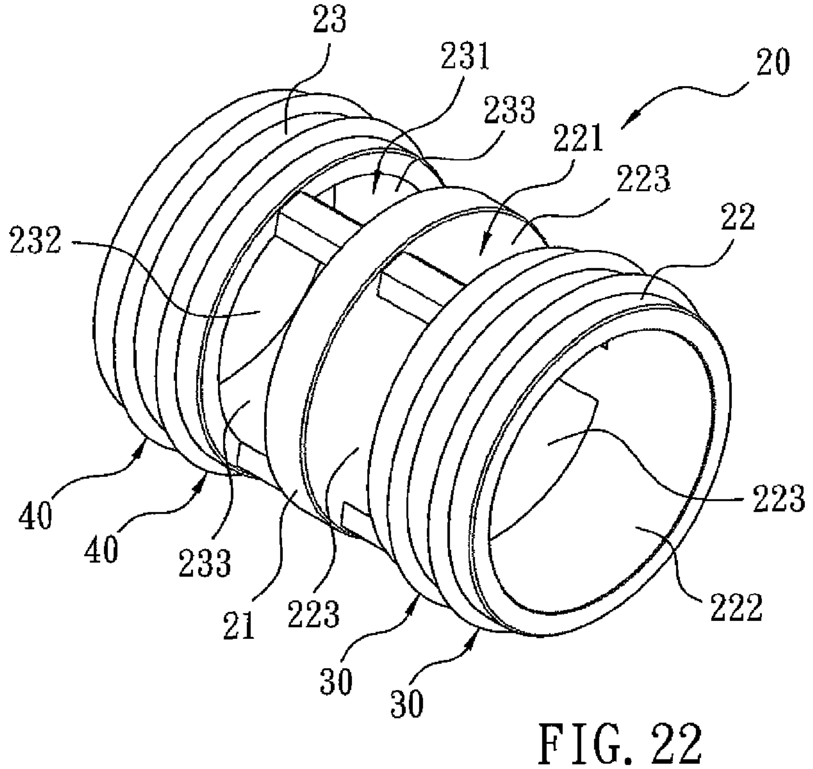
FIG. 22 is a perspective view showing the assembly of a valve core, two first resilient loops and two second resilient loops of the pressure balance valve according to the second embodiment of the present invention.

Referring to FIGS. 20-22, the pressure balance valve 1 is fixed between a mounting groove 3*a* of the faucet body 3 and the bottom end of the temperature controlling valve 4, and the receiving chamber 10 is defined by a housing 101 and a fitting sleeve 102 secured in the housing 101, wherein the housing 101 is formed by connecting two symmetrical semi-housings 103 together, and the housing 101 has two pores 15 defined on two sides of a bottom end thereof relative to an external cold-water inlet 11 and an external hot-water inlet 12 formed on the fitting sleeve 102. The housing 101 also has an external cold-water outlet 13 and an external hot-water outlet 14 arranged on two sides of a top end thereof so as to communicate with an inertial cold-water outlet 222 and an internal hot-water outlet 232 formed on two mouths of two sides of the valve core 20. Thereby, the cold water and the hot water flow into the valve core 20 from the faucet body 3 through the two pores 15, the external cold-water inlet 11, the external hot-water inlet 12, an internal cold-water inlet 221 and an internal hot-water inlet 231. The cold water and the hot water flow into the temperature controlling valve 4 from the inertial cold-water outlet 222 and the internal hot-water outlet 232 via the external cold-water outlet 13 and the external hot-water outlet 14, thus mixing the cold water and the hot water together.

The internal cold-water inlet 221 is comprised of three second apertures 223 isometrically arranged around the first ring portion 22; the internal hot-water inlet 231 is comprised of three first apertures 233 isometrically arranged around the second ring portion 23.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A pressure balance valve being fixed on a water supply device and comprising:

a receiving chamber being cylindrical and including an external cold-water inlet and an external hot-water inlet which are axially defined along an inner wall of the receiving chamber so that cold water and hot water flow into the receiving chamber from the external cold-water inlet and the external hot-water inlet, the receiving chamber also including an external cold-water outlet and an external hot-water outlet which are axially formed on the peripheral wall thereof so that the cold water and the hot water flow out of the external cold-water outlet and the external hot-water outlet from the receiving chamber;

a valve core including a pressure sensing fence radially extending thereon, a first ring portion and a second ring portion which axially extend along two sides thereof; between the first ring portion and the pressure sensing fence being defined a cold-water pressure cavity; between the second ring portion and the pressure sensing fence being defined a hot-water pressure cavity; the first ring portion having an internal cold-water inlet and an internal cold-water outlet which communicate with each other via the cold-water pressure cavity, wherein the internal cold-water inlet communicates with the external cold-water inlet, and the internal cold-water outlet communicates with the external cold-water outlet; the second ring portion having an internal hot-water inlet and an internal hot-water outlet which communicate with each other via the hot-water pressure cavity, wherein the internal hot-water inlet communicates with the external hot-water inlet, and the internal hot-water outlet communicates with the external hot-water outlet; the first ring portion also having at least one first fixing slot defined on an outer wall thereof; and the second ring portion also having at least one second fixing slot formed on an outer wall thereof;

at least one first resilient loop fitted in the at least one first fixing slot;

at least second resilient loop fitted in the at least one second fixing slot;

wherein among the inner wall of the receiving chamber, the outer wall of the first ring portion, and the outer wall of the second ring portion is defined a gap; and after the at least one first resilient loop and the at least one second resilient loop are mounted, they are pressed by water pressure to cause a deformation so as to fill the gap.

2. The pressure balance valve as claimed in claim 1, wherein when the at least one first resilient loop and the at least one second resilient loop are in an uninstalled condition, a cross-sectional area of each of the at least one first resilient loop and the at least one second resilient loop is circular.

3. The pressure balance valve as claimed in claim 1, wherein when the at least one first resilient loop and the at least one second resilient loop are in an installed condition, an outer diameter of each of the at least one first resilient loop and the at least one second resilient loop is D; a diameter of the outer wall of each of the first ring portion and the second ring portion is D1; an inner diameter of the inner wall of the receiving chamber is D2; wherein $D1 < D < D2$.

4. The pressure balance valve as claimed in claim 1, wherein a diameter of the outer wall of each of the first ring portion and the second ring portion is D1; an inner diameter of the inner wall of the receiving chamber is D2; wherein $0.03\ mm < D2 - D1 < 0.2\ mm$.

5. The pressure balance valve as claimed in claim 4, wherein $0.1\ mm < D2 - D1 < 0.2\ mm$.

6. The pressure balance valve as claimed in claim 1, wherein each of the at least one first resilient loop and the at least one second resilient loop is made of flexible material with hardness and wearing resistance.

7. The pressure balance valve as claimed in claim 6, wherein the flexible material is rubber material.

8. The pressure balance valve as claimed in claim 7, wherein the rubber material is any one of Acrylonitrile Butadiene rubber (NBR), Ethylene Propylene Diene Monome (EPDM), and polysiloxanes.

9. The pressure balance valve as claimed in claim 7, wherein a hardness (Shore hardness A) of the rubber material is within 60 to 90 degrees.

10. The pressure balance valve as claimed in claim 1, wherein the at least one first fixing slot is two first fixing slots, the at least one first resilient loop is two first resilient loops, the at least one second fixing slot is two second fixing slots, and the at least one second resilient loop is two second resilient loops.

11. The pressure balance valve as claimed in claim 10, wherein the valve core axially moves between a first dead point and a second dead point of the receiving chamber; when the valve core moves close to the first dead point, the two first resilient loops close the inner wall of the receiving chamber where the external cold-water inlet is defined so that the cold water which flows into the internal cold-water inlet from the external cold-water inlet is closed; when the valve core moves close to the second dead point, the two second resilient loops close the inner wall of the receiving chamber where the external hot-water inlet is defined so that the hot water which flows into the internal hot-water inlet from the external hot-water inlet is closed.

12. The pressure balance valve as claimed in claim 1, wherein the receiving chamber is defined by a thermostatic valve core in a cylinder shape, an end plug for closing a bottom end of the thermostatic valve core, and a central shaft secured on thermostatic valve core; the thermostatic valve core, end plug and central shaft are part of a temperature controlling valve.

13. The pressure balance valve as claimed in claim 1, wherein the receiving chamber is defined by a housing and a fitting sleeve secured in the housing.

14. The pressure balance valve as claimed in claim 1, wherein the water supply device is a temperature control faucet and includes a temperature controlling valve adjacent to the pressure balance valve.

* * * * *